United States Patent Office 3,166,424
Patented Jan. 19, 1965

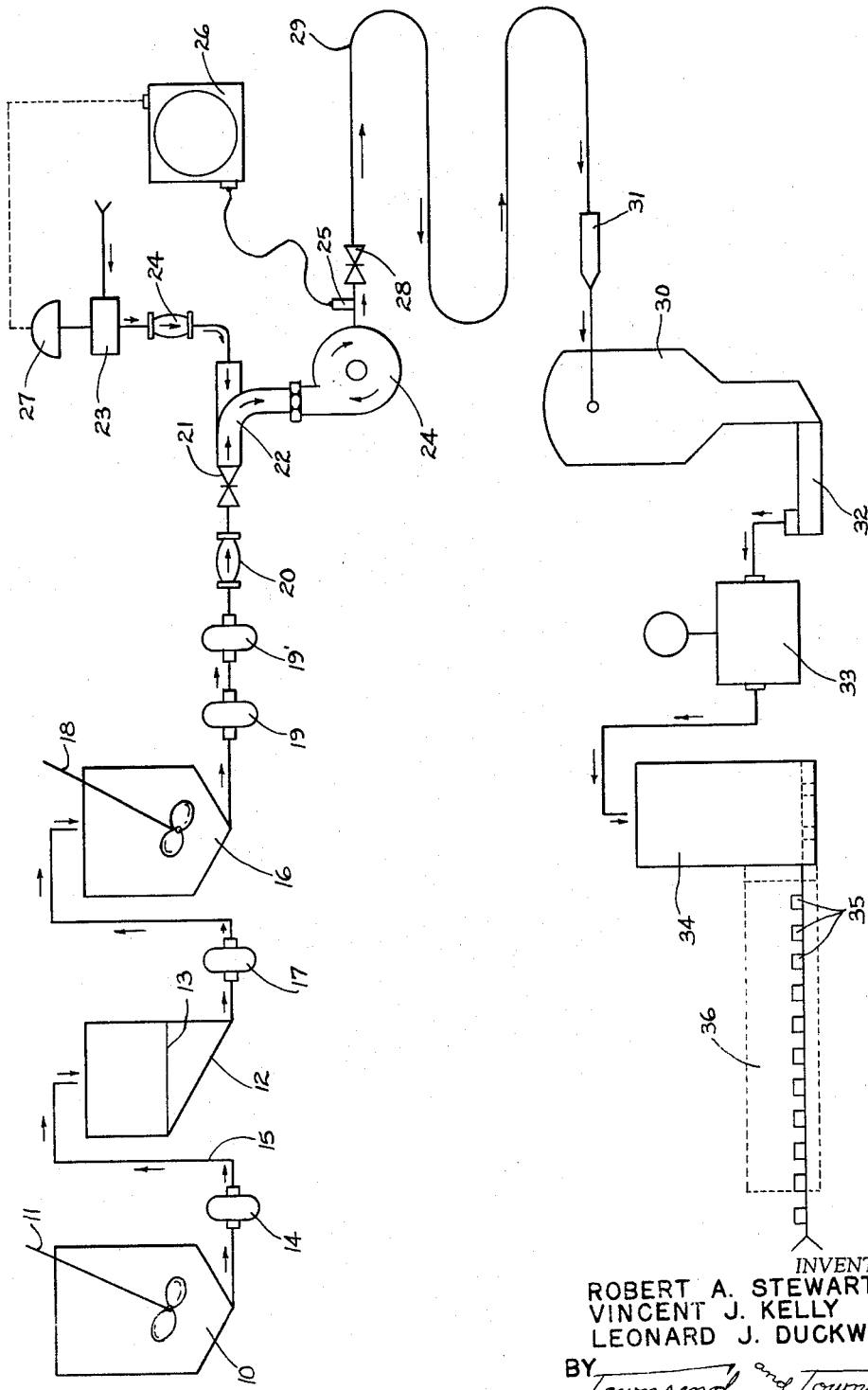

3,166,424
EGG YOLK PROCESS
Robert A. Stewart, San Lorenzo, Vincent J. Kelly, Alameda, and Leonard J. Duckworth, Union City, Calif., assignors to Gerber Products Company, Oakland, Calif.
Filed Jan. 14, 1963, Ser. No. 251,184
6 Claims. (Cl. 99—182)

This invention relates to the processing of food materials and particularly high protein content food materials which are characterized as coagulable when subjected to heat. Examples of such foods are eggs, meats and custards. More specifically, this invention relates to an improvement in the process for preparing such food products which results in improved consistency properties, flavor qualities, texture and uniformity.

The present invention is predominantly used for preparing foods for the feeding of infants. Previously, taking egg yolks as an example, the product was generally prepared by slurrying egg yolks at temperatures and times sufficient to partially coagulate the protein in the egg yolk. The partially coagulated material was then cooled and placed in a container and sealed. The cooled product in the container was then sterilized by conventional retort processing during which time the egg yolk proteins acquired a final coagulated or gelled paste-like texture and body. In order to guarantee commercial sterility (especially necessary for the principal use of the product as an infant food) the egg yolks in the container had to be held at high temperatures for a considerable period of time. While the product obtained from the prior art process is highly satisfactory and has met with substantial commercial success, there is still room for improvement, principally in the area of the taste of the final product and the water separation characteristics. The final retort processing and its necessary long period of time at high temperature makes possible a certain amount of alteration of the flavor characteristics of the product. The present invention is an improvement upon these prior techniques of processing egg yolks (such as that described and claimed in United States Patent No. 2,766,126, patented October 9, 1956), and is particularly adapted to avoid any alteration in the flavor characteristics of the product and the water separation problem.

In essence, the present invention avoids the difficulties of the prior art by omitting terminal retort processing. In the present invention the requisite degree of sterility is obtained by an initial flash sterilization of the food material. Thereafter the product is subjected to only the minimum amount of heat necessary to achieve the desired product consistency and avoids high temperature long term retorting.

The invention is here described in reference to eggs but it is understood to be applicable in reference to high protein content foods which are heat coagulable or which are denatured by heat treatment to form a gel. Examples of such foods are eggs, meats and custards.

Thus in accordance with the preferred embodiment of the present invention there is provided an improved method for preparing a sterile egg puree comprising preliminarily flash heat sterilizing an aqueous egg yolk slurry and also thereby causing partial precoagulation of the egg yolk. The partially precoagulated egg yolk in slurry form is then aseptically sealed in a sterile container and subjected to the heat necessary to achieve the desired product consistency.

The process in most respects other than the sterilization steps follows the details of the prior art such as described in Patent No. 2,766,126. Thus, as in the prior art, the product may be prepared from egg yolk such as dehydrated egg yolk, fresh egg yolk, or frozen egg yolk. Further, the egg yolk may be used alone or mixed with whites. In forming the aqueous slurry of egg yolk, water is conveniently used. However, as before, dairy milk, for example, or other suitable aqueous base material could be used.

In more detail and with reference to the accompanying flow sheet, the present improved process may be practiced by employing a batch or preparation tank 10 provided with a mechanical agitating member 11. The egg yolk material and suitable aqueous fluid such as water are combined in tank 10 by actuation of member 11 to provide an egg yolk slurry. The slurry is suitably prepared so that the total solids are between about 5–50% by weight. From a practical standpoint, the slurry may contain on the order of about 20–35% solids by weight.

The slurry formed in tank 10 is pumped to finishing tank 12 having a suitable screen 13 therein for straining the slurry. Pumping is suitably accomplished by means of pump 14 situated in conduit 15 linking tanks 10 and 12. Seasoning and other suitable additives may be combined with the slurry in tank 12.

The slurry is then pumped to a holding tank 16 by means of pump 17. Agitating member 18 in tank 16 serves to further insure a uniformity in the composition of the slurry. The egg yolk slurry in holding tank 16 is then flash heated in a suitable heating and mixing chamber by the action of steam.

As illustrated, the flash heating may be accomplished by pumping the slurry from tank 16 with pumps 19, 19' through check valve 20, orifice adapters 21, and into an elbow heater 22 where the slurry is contacted with steam introduced from steam supply 23 through check valve 24. The steam is further intimately and thoroughly mixed with the slurry in a suitable agitating mixing chamber such as rotating chamber 24.

The temperature of the steam and the holding time of the slurry at the temperature created by the steam is selected to achieve the desired level of sterilization. Generally, the temperature created by the steam and the holding time should be sufficient to obtain an $F_0$ value of at least about 25 where the final product is used as an infant food. Preferably the degree of sterilization is chosen so that $F_0$ is between about 25–100. This condition may be obtained by introducing steam into elbow heater 22 under sufficient pressure to raise the temperature of the slurry to between about 275–310° F., and holding the slurry at the temperature for between about 8–95 seconds. Most preferably, the temperature range for the slurry is between about 280–300° F.

These temperature conditions may be conveniently automatically regulated by providing a thermocouple 25 at the discharge end of mixing chamber 24 which senses the temperature of the discharged slurry and sends a suitable signal to temperature controlling and recording instrument 26. Temperature control 26 actuates steam valve 27 as needed to control the output of steam through valve 24 into heater 22 so that the temperature of the slurry is maintained at the desired point.

As understood by those skilled in the art, the introduction of steam and the mixture thereof with the slurry results in a substantially instantaneous heating of the slurry. This rapid method of increasing the temperature is generally known as flash heating and is so used herein. By using a flash technique the duration of the total exposure to relatively high heat of the egg yolk is kept at a minimum to thereby avoid any alteration of the flavor of the egg product.

By flash heating, the egg product is raised to the sterilization temperature almost instantly and may then be discharged through orifice adapter 28 into a holding coil 29 which may be suitably lined and insulated. By controlling the pumping rate of pumps 19, 19' and the length of coil 29, the holding time at which the slurry is maintained at the temperature to which it has been raised in heater 22 is suitably controlled. As noted, the holding time for the slurry preferably varies between about 8–95 seconds when the degree of sterilization also noted above is desired.

After being held for the necessary time, the slurry is flash or instantly cooled under aseptic conditions in tank 30. Cooling is preferably accomplished by applying negative pressure interiorly of tank 30 (by suitable means not shown) so that the steam in combination with the slurry is expanded and the product cooled. A back pressure valve 31 links coil 29 with tank 30 so that the negative pressure in tank 30 is not imparted to coil 29. The slurry is preferably cooled in tank 30 to a temperature of about 80–120° F. with excellent results having been observed at a temperature of about 100° F.

The cooled slurry is then flowed by a suitable pump 32 into a homogenizer 33 where the slurry may be aseptically homogenized in convention fashion if desired. In many cases homogenization will not be desired because the protein has not set up or gelled to any appreciable extent during the preceding steps. This is generally true in the case of egg yolks. It is believed that the mechanical action achieved in the elbow heater 22 and the agitating heater and chamber 24 is sufficiently vigorous, at least in the case of egg yolks, to prevent the protein from setting up and thereafter necessitating a mechanical break up of the solid protein gel. In the case of egg yolks and other protein foods within the scope of the present method not requiring homogenization, the homogenizer may still conveniently be left in the process line to serve as a constant displacement feed pump.

The slurry is then flowed to a container filling device 34 such as a Dole aseptic filling machine wherein the slurry is aseptically placed in containers 35 and sealed. The containers are then subjected to a further heating in a heating chamber 36. An aseptic filling system is disclosed in United States Patent No. 2,549,216 to Martin.

This final heat treatment is necessary because the product during the sterilization is only partially precoagulated. This final heating serves to convert the egg slurry to a puree having a final coagulative consistency in all ways similar to that obtained in the prior art methods. Thus this final heat treatment is adapted to subject the protein content of the partially precoagulated egg slurry to further heat coagulation until a finely divided state is reached, and where the product has an attractive bright yellow appearance and a uniform texture approximating smooth custard pudding.

This desired final consistency is obtained by heating for a limited period and temperature that is just sufficient to obtain the desired final consistency but insufficient to alter the flavor thereof. Preferably this final heating is executed at about 190–250° F. with the time selected as necessary. Excellent results have been obtained by heating at about 210° F. for about 15 minutes to obtain the final consistency. It should be noted that this final heating step differs from previous final heating steps in that the heating employed here is merely that which obtains the final desired consistency whereas previously, the final heating employed was that necessary to sterilize the product. Sterilization required relatively high temperature and long holding times compared with the temperatures and times required in this state of the present procedure. As a result, flavor is consistent in the present method and difficulties of syneresis avoided and a superior product obtained.

Although the foregoing invention has been described in some detail in respect to eggs by way of illustration and example for purposes of clarity of understanding, it is understood that other heat coagulable protein foods may be treated and other changes and modifications may be practiced within the spirit of the invention as limited only by the scope of the appended claims.

What is claimed is:

1. An improved method for preparing a sterile high protein content food material which is coagulable when subjected to heat which comprises providing an aqueous slurry of such food material, then preliminarily flash heat sterilizing said slurry prior to the final coagulation thereof and then further aseptically processing the sterilized product including the further heating thereof to obtain a product of final coagulative consistency.

2. An improved method for preparing a sterile high protein content food material which is coagulable when subjected to heat taken from the group consisting of eggs, meats and custards which comprises providing an aqueous slurry of such food material, then preliminarily flash heat sterilizing said slurry and also thereby causing partial coagulation thereof, and then further aseptically processing the sterilized product to obtain a product of final coagulative consistency and including preserving the product by aseptically sealing it in a container.

3. An improved method for preparing a sterile egg puree comprising preliminarily sterilizing an aqueous egg yolk slurry by flash heating the slurry to obtain an $F_0$ value of at least about 25, aseptically flash cooling the slurry, aseptically sealing the slurry in a container, and then heating the sealed container sufficiently to produce a final coagulative consistency in the puree but insufficiently to alter the flavor thereof.

4. An improved method for preparing a sterile egg puree product comprising preliminarily sterilizing an aqueous egg yolk slurry by flash heating with steam at about 275–310° F. for a time sufficient to obtain an $F_0$ value of at least about 25 and to thereby also cause partial precoagulation of the egg yolk, aseptically flash cooling the slurry, aseptically sealing the slurry in a container, and then heating the sealed container sufficiently to produce a final coagulative consistency in the puree but insufficiently to alter the flavor thereof.

5. An improved method for preparing a sterile egg puree comprising preliminarily sterilizing an aqueous egg yolk slurry containing about 5–50% yolk solids by flash heating with steam at about 275–310° F. for a time sufficient to obtain an $F_0$ value of about 25–100, aseptically flash cooling the product to about 80–120° F., aseptically sealing the slurry in a container, and then further heating the container at about 190–250° F. for a time sufficient to obtain a puree of final coagulative consistency but insufficiently to alter the flavor thereof.

6. An improved method for preparing a sterile egg puree product comprising preliminarily heat sterilizing an egg yolk slurry containing about 30% total solids by flash heating with steam at about 280–300° F. for about 8–95 seconds and to also thereby cause partial precoagulation of the egg yolk, aseptically flash cooling the slurry to about 100° F. by application of negative pressure thereto, aseptically sealing the slurry in a container, and further heating the slurry at about 210° F. for about 15 minutes to obtain an egg puree of final consistency.

References Cited by the Examiner

UNITED STATES PATENTS

| | | | |
|---|---|---|---|
| 2,766,126 | 10/56 | Hawk | 99—182 |
| 2,930,705 | 3/60 | Janak et al. | 99—182 |
| 2,999,024 | 9/61 | Stimpson | 99—182 |

A. LOUIS MONACELL, *Primary Examiner.*